Nov. 7, 1950   M. L. GREENOUGH   2,528,512
ENERGIZING CIRCUIT FOR SERVO SYSTEMS
Filed Sept. 29, 1945   2 Sheets-Sheet 1
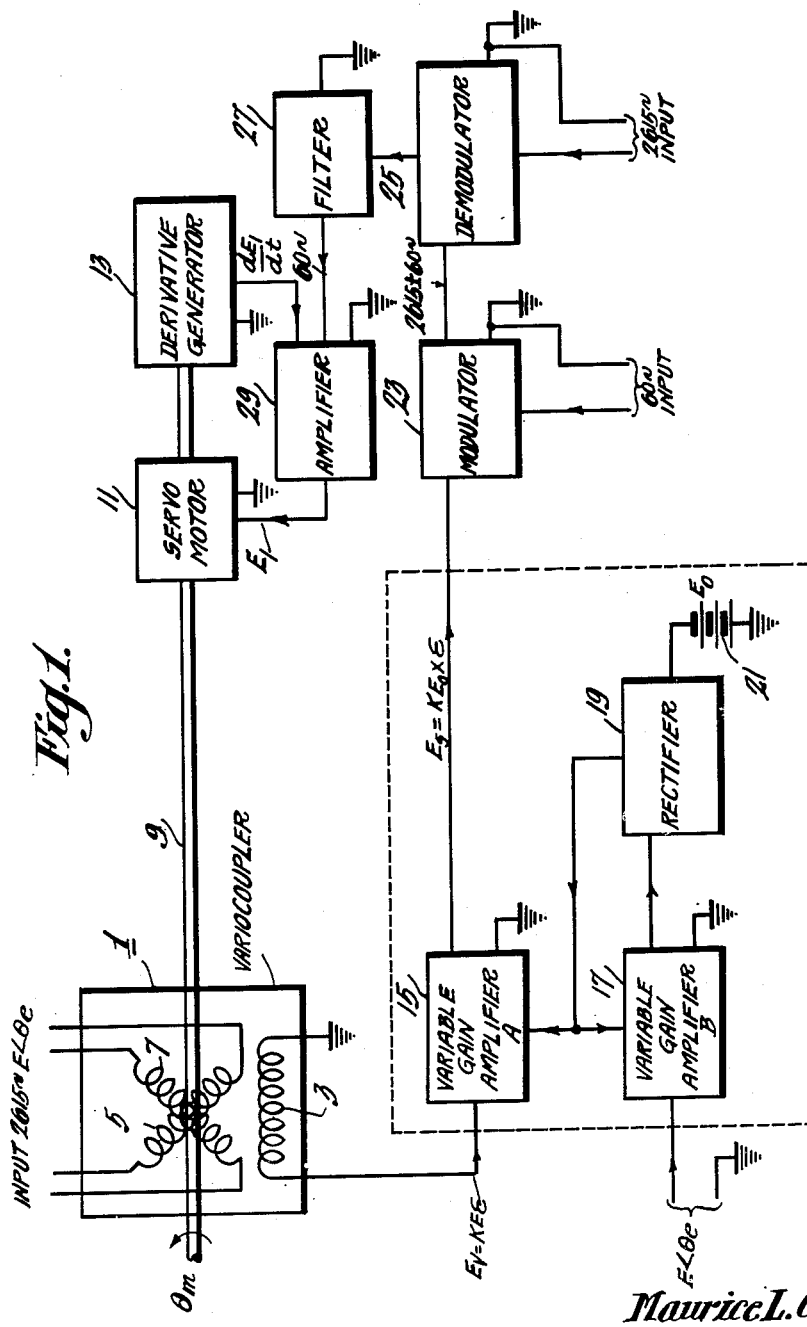
INVENTOR.
Maurice L. Greenough
BY
ATTORNEY

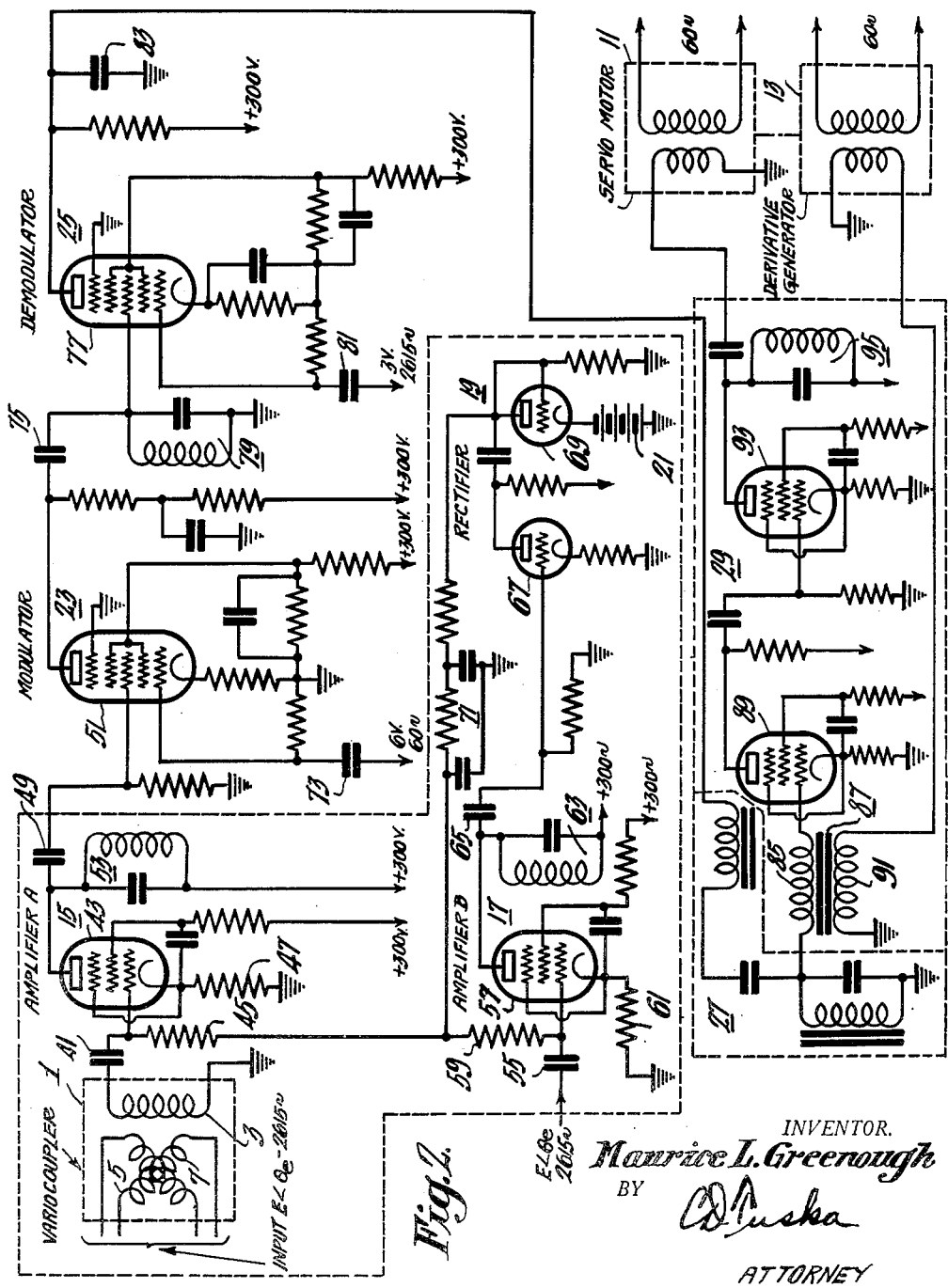

Patented Nov. 7, 1950

2,528,512

UNITED STATES PATENT OFFICE 2,528,512

ENERGIZING CIRCUIT FOR SERVO SYSTEMS

Maurice Leighton Greenough, Groveland, Mass., assignor to Radio Corporation of America, a corporation of Delaware Application September 29, 1945, Serial No. 619,398

13 Claims. (Cl. 318—28)

This invention relates generally to electrical servo systems and more particularly to an improved energizing circuit and anti-hunt system for servo mechanisms for converting an electrical phase angle to a mechanical angle of rotation and wherein a voltage proportional to the rate of change of the energizing voltage applied to the servomotor is subtracted from said energizing voltage for stabilizing the servo operation.

In electronic computing systems for solving ballistic functions in the process of sighting a gun at a remote, fixed or movable target, it is customary to convert the polar coordinates of the present position and course of the target to electrical voltages having magnitudes corresponding to the values of the Cartesian coordinates of the future target position as determined by the target velocity and by the ballistic characteristics of the weapon. The gun azimuth and elevation for deriving the proper trajectory for aiming the weapon at the future target position are converted from Cartesian coordinates in the horizontal and vertical planes to polar coordinates in said planes. The actual gun pointing is accomplished by synchronized motors actuated by servomotor mechanisms which are responsive to voltages corresponding to the angular components of the polar coordinates of the future target position.

For example, the gun azimuth is obtained by impressing upon the perpendicularly disposed rotor coils of a precision variocoupler the potentials derived from the electronic computer mechanism representing the future ground plane coordinates. Since the rotor coils are at right angles to each other, the intensity of the field established by them is proportional to the future ground range, and is spatially at an angle to the zero plane of the rotor windings which is equal to the future azimuth angle. The voltage induces in a fixed stator winding of the variocoupler, therefore, is proportional to the horizontal range and to the sine of the angle between the resultant field of the rotor windings and a plane perpendicular to the axis of the fixed stator winding.

The servomotor and the variocoupler rotor are mounted upon or geared to a common rotatable shaft. The output voltage derived from the variocoupler stator winding is applied to a converter-amplifier circuit which drives the servomotor in a direction which tends to reduce the stator voltage of the variocoupler to a zero value. In other words, the variocoupler rotor is rotated by the servomotor until the resultant field of the rotor windings is perpendicular to the axis of the stator winding, whereby the shaft is rotated through an angle equal to the azimuth angle. Correction voltages for windage and drift may be added in series with the output voltage of the stator winding whereby such corrections may be effectively added to the normal azimuth angle. The resolving variocoupler and servomotor are coupled to synchronous motor units for coarse control of the gun pointing. Finer control of the gun pointing is obtained by other synchronous motors differentially connected to the coarse motor control and having a relatively high ratio of angular displacement to that of the variocoupler shaft.

The instant invention comprises a novel converter-amplifier circuit interposed between the resolving variocoupler stator winding and the servomotor. It includes a circuit which is responsive to the relatively high computer frequency (for example, 2615 cycles) and to the power line frequency (60 cycles) for deriving a signal of the power line frequency which varies in amplitude substantially only as a function of the unbalance of the rotor and stator of the variocoupler. The converter-amplifier circuit includes an automatic volume control network for stabilizing the loop gain of the circuit in order that the servomotor energizing currents may be substantially independent of variations in the amplitude of the variocoupler rotor currents.

In order to minimize hunting and overshooting by the servomotor, apparatus is provided for generating a correction current which is proportional to the rate of change of the servomotor energizing current. The correction current is effectively subtracted from the normal servomotor energizing current. This feature provides maximum starting and stopping torque while preventing abnormally high motor acceleration during the remainder of the time during which servomotor is rotated. This device is disclosed and claimed in applicant's copending U. S. application, Serial No. 619,241, filed September 28, 1945, now Patent No. 2,497,216, issued February 14, 1950, assigned to the same assignee as the instant application.

The correction current generating circuit comprises a rotary differentiating voltage generator, the rotor of which may be separately driven by the servomotor energizing current or which may be connected directly to, or geared to, the servomotor shaft. The field of the generator is excited by currents of the same frequency as that of the servomotor energizing current. The differentiating current generator may comprise any well known type of rotary motor apparatus such as a two-phase motor, wherein the output voltage is directly proportional to the rate of change of the generator shaft angular velocity. This type differentiating current generator is superior to other types of reactive or passive networks in that the derivative signals generated thereby may be of relatively higher power or voltage. The servomotor may be a conventional shaded-pole reversible motor or any other of the type employed in conventional servo systems.

Among the objects of the invention are to provide an improved method of and means for operating servomotor systems. Another object is to provide an improved servomotor system including an anti-hunt network.

Another object is to provide an improved converter-circuit for converting voltages derived from an unbalanced variocoupler to energizing voltages of a different frequency for actuating a servo mechanism to balance said variocoupler. A further object is to provide an improved converter circuit for a servo energizing network which is independent of the signal level in the servo control portion of said converter circuit. An additional object is to provide a servo energizing converter circuit having constant loop gain.

A further object is to provide an improved servo system having a converter-amplifier circuit for converting an electrical phase angle to a mechanical angle of rotation of the servo mechanism and an anti-hunt circuit comprising a differentiating voltage network responsive to the servomotor energizing potential for generating a correction voltage proportional to the rate of change of the energizing voltage, wherein the correction voltage is subtracted from the servomotor energizing voltage. An additional object is to provide an improved servomotor energizing and correction voltage network including a resolving variocoupler for converting the Cartesian coordinates of a position to voltages representing the angular component of the polar coordinates of said position, a circuit for converting said voltages to provide angular rotation of said motor, means for generating a correction voltage proportional to the first derivative of said output voltage, and means for subtracting the correction voltage from the converted voltage for providing a driving voltage for a servo mechanism.

The invention will be described in greater detail by reference to the accompanying drawings of which Figure 1 is a block schematic circuit diagram of a servo system including a preferred embodiment of the invention, and Figure 2 is a schematic circuit diagram of a preferred embodiment of the novel converter-amplifier circuit forming a component of said servomotor driving system. Similar reference characters are applied to similar elements throughout the drawings.

Referring to Figure 1, a servomotor control and stabilizing network includes a variocoupler type resolving device, a converter-amplifier for controlling the servo energizing currents as a function of the unbalance of the variocoupler, a servomotor and a derivative generator for stabilizing the operation of the servomotor. The variocoupler 1 is of the precision type including a fixed stator winding 3 and a pair of perpendicularly disposed rotatable rotor windings 5 and 7. The rotor shaft 9 of the variocoupler 1 is coupled to the armature of a servomotor 11 and to the armature of a derivative voltage generator 13. Input signals to the servo system applied to the rotor windings 5 and 7 correspond to the values of the Cartesian coordinates of a position to which the servo system is to be adjusted. The input voltages have a magnitude E at an electrical phase angle $\theta_e$.

It is desirable that the system shall have an operating characteristic which is substantially independent of the magnitude E of the input voltages since it is essential that the servomotor torque be proportional only to the angular deviation of the variocoupler rotor from balance. Therefore a converter-amplifier system is provided for deriving energizing currents for the servomotor which are a function only of the angular deviation of the variocoupler rotor from balance.

For this purpose an inverse gain control amplifier is provided for deriving output signals having a magnitude substantially proportional only to the angular deviation from balance of the variocoupler windings. The inverse gain control amplifier includes a first variable-gain amplifier 15 which is connected to the variocoupler stator winding 3 and is responsive to the stator voltage $E_v = KE_\epsilon$, where $\epsilon$ is the angular deviation from balance of the variocoupler rotor. A second variable gain amplifier 17 is responsive to the rotor input voltage E at a phase angle $\theta_e$. The output of the second variable gain amplifier 17 is connected to a rectifier 19 having a fixed bias $E_0$ derived, for example, from a battery 21. Signals derived from the rectifier 19 are proportional in magnitude to the difference of the output voltages of the second variable gain amplifier 17 and the reference potential $E_0$. The difference voltage thus obtained is applied to both variable gain amplifiers 15 and 17 to control the gain thereof. The gain of both amplifiers is the same for all bias voltage values. Since the input to the second variable gain amplifier 17 is the voltage vector E being resolved, the gain of the first variable gain amplifier will be inversely proportional to the rotor input voltage $E_v$. Therefore the output voltage $E_s$ derived from the first variable gain amplifier 15 will be equal to $KE_0\epsilon$ where $\epsilon$ is the angular deviation from the balance of the variocoupler rotor.

Since K and $E_0$ both are constants, it is apparent that the output voltage from the first variable-gain amplifier is dependent only upon the angular deviation from balance of the variocoupler rotor. The output voltage $E_s$ has a frequency of 2615 cycles which corresponds to the input frequency to the variocoupler rotor windings.

The output signal $E_s$ from the first variable gain amplifier 15 is applied to a modulator circuit 23 which also is responsive to signals having a frequency of 60 cycles for driving the servomotor. Signals having both 2615 cycle and 60 cycle components derived from the modulator 23 are applied to a demodulator 25 which also has applied thereto other input signals of the 2615 cycle frequency. The output of the demodulator 25 is applied to a low-pass filter 27 which rejects the higher frequency signal components and passes the 60 cycle signals. The 60 cycle signals derived from the filter 27 are amplified by a power amplifier 29 and applied to the armature winding of the servomotor 11 to rotate the servomotor and the rotor windings 5 and 7 of the variocoupler 1 in a direction to balance the variocoupler. Such balance obtains when the resultant field of the rotor windings 5 and 7 is perpendicular to the axis of the stator winding 3 of the variocoupler. The derivative generator 13 coupled to the servomotor 11 is of the type described and claimed in applicant's copending application Serial No. 619,241, filed September 28, 1945, now Patent No. 2,497,216. The derivative voltage $$\frac{dE}{dt}$$

is proportional in magnitude to the rate of change of angular velocity of the variocoupler shaft 9, and is applied in phase opposition to the 60 cycle input voltages applied to the amplifier 29 for stabilizing the operation of the servomotor and for minimizing overshooting and hunting thereof.

Considering the operation of the inverse gain control amplifier from a somewhat different standpoint, it is seen that $$E \times (\text{gain of amplifier } B) = E_0 \quad (1)$$

Since the gain of amplifier B equals the gain of amplifier A, the gain of amplifier A equals $$\frac{E_0}{E}$$

The stator voltage $E_v$ derived from the variocoupler is proportional to the rotor input voltage $E$ and to the angular deviation from balance. Thus $$E_v = KE\epsilon \quad (2)$$

Therefore, the output voltages $E_s$ derived from amplifier A are $$E_s = E_v \text{ (gain of } A) = KE\epsilon \times \frac{E_0}{E} = KE_0 \times \epsilon \quad (3)$$

Since $K$ and $E_0$ are fixed, it follows that the output voltage $E_s$ derived from the first variable gain amplifier 15 is dependent only upon the angular deviation from balance $\epsilon$ of the variocoupler. The component circuits of the remainder of the control system are linear, so that the system loop gain is a constant value determined only by circuit components.

Figure 2 shows a schematic circuit diagram corresponding to the block circuit diagram of Figure 1. The variocoupler rotor windings 5 and 7 are connected to the source of 2615 cycle input signals having a magnitude E at a phase angle $\theta_e$. The stator winding 3 is coupled through a capacitor 41 to the control electron of a pentode type variable gain amplifier tube 43 comprising the first variable gain amplifier 15. Gain control bias is applied to said control electrode through a grid resistor 45. The cathode is grounded through a cathode resistor 47. The anode of the tube is connected through an output blocking capacitor 49 to the second control electrode of a hetrode modulator tube 51. Anode potential is applied to the first amplifier tube 43 through a parallel-resonant circuit 53 tuned to the input frequency of 2615 cycles.

Another connection to the input signal source of 2615 cycles having voltage magnitude E at a phase angle $\theta_e$ is provided through a second input capacitor 55 to the control electrode of a second pentode amplifier tube 57 comprising the second variable gain amplifier 17. Gain control bias is applied to the electrode of the tube 57 through a second grid resistor 59, whereby the same gain control bias potential is applied to both of the variable gain amplifier tubes 43 and 57. The cathode of the second variable gain amplifier tube 57 is grounded through a cathode resistor 61. The anode of the tube is supplied with operating potential through a second parallel-resonant circuit 63 which is tuned to the input frequency of 2615 cycles.

The anode of the second variable gain amplifier tube 57 also is coupled through a coupling capacitor 65 to the grid of a triode amplifier 67, the anode of which is coupled to a second triode 69 which is connected as a diode rectifier. The cathode circuit of the rectifier 69 includes a battery 21, the positive terminal of which is grounded. The battery 21 represents the reference potential source $E_0$.

The anode of the rectifier 69 is connected through a resistive-capacitor filter 71 to the common terminal of the grid resistors 45 and 59 for supplying a common gain control bias to the grids of the first and second variable gain amplifier tubes 43 and 57. The portion of the circuit thus described comprises an automatic-gain-control circuit in which the gain of the first amplifier 15 is inversely proportional to the magnitude of the input voltage applied to the rotor windings, whereby output signals applied to the second grid of the modulator tube 51 are substantially independent of the magnitude of the signals applied to the variocoupler rotor.

A source of 60 cycle signals is connected through a third input capacitor 73 to the first control electrode of the hetrode modulator tube 51. Modulated signals having components of 60 cycles and 2615 cycles derived from the anode of the modulator tube 51 are applied through a relatively small coupling capacitor 75 to the second control electrode of a second hetrode demodulator tube 77. This second control electrode circuit includes a parallel-resonant circuit 79 which is tuned to the 2615 cycle frequency. The first control electrode of the demodulator hetrode 77 is coupled through a fourth input capacitor 81 to a source of 2615 cycle signals. The high frequency components of the signals derived from the demodulator tube 77 are by-passed to ground through a capacitor 83 connected in shunt with the anode circuit of the tube.

The anode is coupled through a series-parallel resonant filter 27 and through a series-connected secondary winding 85 of a transformer 87 to the control electrode of a pentode amplifier tube 89. The series-parallel resonant filter 27 is tuned to pass substantially only signals having a frequency of 60 cycles. Thus the signals applied to the pentode amplifier tube 89 will have a frequency of 60 cycles and will vary in amplitude substantially only as a function of the unbalanced condition of the variocoupler providing the 2615 cycle signals.

Derivative signals from the derivative generator 13 are applied to the primary winding 91 of the transformer 87, and are effectively subtracted from the 60 cycle signals derived from the filter 27 and applied to the control electrode of the pentode amplifier 89. The pentode amplifier tubes 89 and 93 comprise the power amplifier 29 for energizing the armature winding of the servomotor 11. The servomotor and derivative generator field windings may be excited by 60 cycle currents. The output circuit of the motor amplifier tube 93 includes a parallel resonant network 95 which is tuned to 60 cycles.

Thus the invention disclosed comprises a novel converter-amplifier circuit for energizing a servomotor wherein high frequency signals derived from a resolving variocoupler are employed to control the magnitude of low frequency signals which are utilized to energize the servomotor. The low frequency signal magnitude is determined by the unbalance of the variocoupler providing the high frequency signals, and is substantially independent of the amplitude of said high frequency signals applied to the variocoupler rotor windings. The high frequency signal amplitude is stabilized by an inverse-gain-control amplifier network. Signals having amplitudes corresponding to the derivative of the 60 cycle motor energizing signals are effectively subtracted from the energizing signals to stabilize the operation of the servomotor by preventing hunting and overshooting thereof.

I claim as my invention:

1. In a constant loop gain servomotor system having an input signal source, a second source of signals of amplitude dependent upon the rotational unbalance of a pair of coupled circuits energized from said input signal source, a servomotor, a source of energy of a second frequency for said motor, a source of reference potential, and a pair of substantially identical variable gain amplifiers each responsive to one of said sources of signals, the method comprising the steps of rectifying amplified input signals derived from one of said amplifiers, combining in opposite polarity said reference potential and said rectified signals to derive a control bias signal, applying said control bias signal to both of said amplifiers to control the gain thereof, deriving from the other of said amplifiers output signals having magnitudes proportional to the degree of said circuit coupling unbalance and substantially independent of the magnitude of said input signals, mixing said signals of said second frequency and said output signals, selecting the modulation component of said second frequency from said mixed signals, said selected component signal having magnitudes proportional to the degree of said coupling circuit unbalance and substantially independent of the magnitude of said input signals, energizing said servomotor by said selected component signals, and coupling said servomotor to said input signal source to adjust the balance of said input signals coupling circuits.

2. The method according to claim 1 including the steps of deriving signals proportional in magnitude to the first derivative of said selected component signals, and utilizing said derivative signals to stabilize the operation of said servomotor.

3. A control system having an input signal source, a second source of signals of amplitude dependent upon the rotational unbalance of a pair of coupled circuits energized from said input signal source, a constant loop gain servomotor system including a servomotor, a pair of substantially identical variable gain amplifiers each responsive to one of said sources of signals, a rectifier responsive to amplified input signals derived from one of said amplifiers, a source of reference potential, means for combining in opposite polarity said reference potential and said rectified signals to derive a control bias signal, means for applying said control bias signal to both of said amplifiers to control the gain thereof for deriving from the other of said amplifiers output signals having magnitudes proportional to the degree of said circuit coupling unbalance and substantially independent of magnitude of said input signals, a source of energy of a second frequency for said servomotor, a modulator for mixing signals of said second frequency and said output signals, a demodulator for selecting the modulation component of said second frequency from said mixed signals, said selected component signal having magnitudes proportional to the degree of said circuit coupling unbalance and substantially independent of the magnitude of said input signals, means for energizing said servomotor by said selected component signals, and means coupling said servomotor to said coupled input circuits to adjust the balance therebetween.

4. A constant loop gain servomotor system including an input signal source, a variocoupler having a pair of rotatable perpendicularly-disposed rotor windings energized from said input signal source and a stator winding, said stator winding providing a second source of signals of said first frequency having magnitudes proportional to the degree of rotational unbalance of said rotor and stator windings, a servomotor having a rotatable shaft, a pair of substantially identical variable gain amplifiers separately responsive to said input and said second signals, a source of reference potential, a rectifier responsive to amplified input signals derived from one of said amplifiers and said source of reference potential for deriving a control bias signal, means for applying said control bias signal to both of said amplifiers to control the gain thereof for deriving from the other of said amplifiers output signals having magnitudes proportional to the degree of variocoupler unbalance and substantially independent of the magnitude of said input signals, a source of energy of a second frequency for said servomotor, a modulator for mixing signals of said second frequency and said output signals, a demodulator for selecting the modulation component of said second frequency from said mixed signals, said selected component signal having magnitudes proportional to the degree of variocoupler unbalance and substantially independent of the magnitude of said input signals, means for energizing said servomotor by said selected component signals, and means mechanically coupling said servomotor shaft to said variocoupler rotor to balance said variocoupler coupling.

5. Apparatus according to claim 4 including means for deriving signals proportional in magnitude to the first derivative of said selected component signal, and means for utilizing said derivative signals to stabilize the rotation of said servomotor shaft.

6. Apparatus according to claim 4 including means mechanically coupled to said servomotor shaft for deriving signals proportional in magnitude to the first derivative of said selected component signal, and means for utilizing said derivative signals to stabilize the rotation of said servomotor shaft.

7. In a control system having an input signal source, a second source of signals of amplitude dependent upon the rotational unbalance of a pair of coupled circuits energized from said input signal source, and a pair of substantially identical variable gain amplifiers each responsive to one of said sources of signals, the method comprising the steps of rectifying amplified signals derived from one of said amplifiers, controlling the gain of both of said amplifiers substantially identically by said rectified voltage substantially as the reciprocal of the magnitude of said rectified signals, and deriving from the other of said amplifiers an output signal proportional in magnitude to the degree of said circuit coupling unbalance and substantially independent of the amplitude of said input signals.

8. In a control system having an input signal source, a second source of signals of amplitude dependent upon the rotational unbalance of a pair of coupled circuits energized from said input signal source, a constant loop gain amplifier system including a pair of substantially identical variable gain amplifiers each responsive to one of said sources of signals, and a source of reference potential, the method comprising the steps of rectifying amplified signals derived from one of said amplifiers, combining in opposite polarity said rectified signals and said reference potential to derive a control bias voltage substantially inversely proportional to the amplitude of said input signals, applying said bias voltage to both of said variable gain amplifiers and to like elements thereof to control the gain of both of said amplifiers similarly, and deriving from the other of said amplifiers an output signal proportional in magnitude to the degree of said circuit coupling unbalance and substantially independent of the magnitude of said input signals.

9. The method according to claim 8 including the step of balancing said second signal coupled circuits in accordance with said output signal.

10. A control system having an input signal source, a second source of signals of amplitude dependent upon the rotational unbalance of a pair of coupled circuits energized from said input signal source, a constant loop gain amplifier system including a pair of substantially identical variable gain amplifiers each responsive to one of said sources of signals, means responsive to amplified input signals derived from one of said amplifiers to derive a voltage proportional to the reciprocal of the amplitude of said input signals, both of said amplifiers having analogous gain control elements to which said voltage is applied to control the gain thereof to substantially the same degree, and means for deriving from the other of said amplifiers an output signal proportional in magnitude to the degree of said input signal circuit unbalanced and substantially independent of the magnitude of said input signals.

11. Apparatus according to claim 10 including means for utilizing said output signal to adjust the balance of said input circuit coupling.

12. A control system having an input signal source, a second source of signals of amplitude dependent upon the rotational unbalance of a pair of coupled circuits energized from said input signal source, a constant loop gain amplifier system including a pair of substantially identical variable gain amplifiers each responsive to one of said sources of signals, means for rectifying amplified input signals derived from one of said amplifiers, a source of reference potential, means for combining in opposite polarity said rectified signals and said reference potential to derive a control bias voltage substantially inversely proportional to the amplitude of the signals of said input source, means for applying said bias voltage to both of said variable gain amplifiers in like manner to control the gain of both of said amplifiers, and means for deriving from the other of said amplifiers an output signal proportional in magnitude to the degree of said circuit coupling unbalance and substantially independent of the magnitude of said input signals.

13. In a control system having an input signal source of variable amplitude, a pair of circuit elements having a coupling dependent on the relative rotational position thereof, and a pair of substantially identical variable gain amplifiers, the steps comprising applying the input signal of said source to one of said amplifiers, applying said input signal to one of said coupled elements and deriving from said other coupled element a signal of amplitude dependent on the relative rotational position of said coupled elements, applying the signal derived from said other coupled element to the other of said amplifier, deriving from the amplified output signal of said one amplifier a D.-C. control voltage, controlling the output of said one amplifier by applying said D.-C. voltage thereto in a magnitude and in a polarity to maintain the output signal thereof substantially constant in amplitude, and applying said D.-C. control voltage in substantially identical manner to said other amplifier, whereby said other amplifier output is dependent on the relative rotational position of the coupled elements and substantially independent of input signal amplitude variations.

MAURICE LEIGHTON GREENOUGH.

REFERENCES CITED

The following references are of record in the file of this patent:

UNITED STATES PATENTS

| Number | Name | Date |
| --- | --- | --- |
| 2,286,106 | Ritzman | June 9, 1942 |
| 2,303,358 | Hoover | Dec. 1, 1942 |
| 2,341,232 | Norton | Feb. 8, 1944 |
| 2,399,695 | Saterlee | May 7, 1946 |
| 2,444,676 | Roberts | July 6, 1948 |

FOREIGN PATENTS

| Number | Country | Date |
| --- | --- | --- |
| 489,271 | Great Britain | July 22, 1938 |